(No Model.) 4 Sheets—Sheet 1.

J. PUSEY.
ARTIFICIAL COASTING OR SLEDDING COURSE.

No. 318,025. Patented May 19, 1885.

WITNESSES:
John Nolan
N H Culver

INVENTOR
Joshua Pusey

N. PETERS, Photo-Lithographer, Washington, D. C.

(No Model.)
4 Sheets—Sheet 2.

J. PUSEY.
ARTIFICIAL COASTING OR SLEDDING COURSE.

No. 318,025. Patented May 19, 1885.

WITNESSES:
John Nolan
N H Culver

INVENTOR
Joshua Pusey (No Model.) 4 Sheets—Sheet 3.
J. PUSEY.
ARTIFICIAL COASTING OR SLEDDING COURSE.
No. 318,025. Patented May 19, 1885.
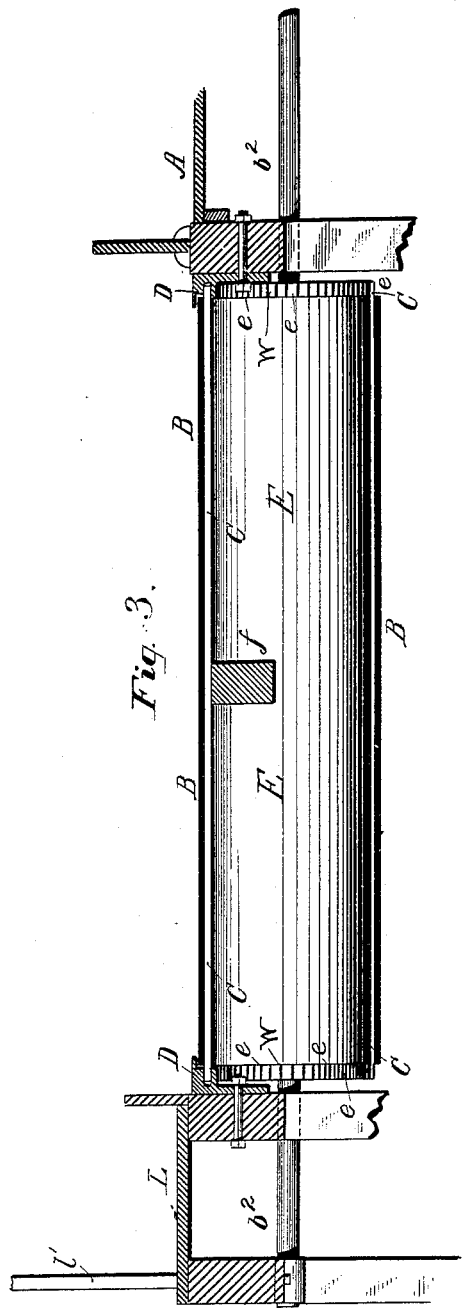
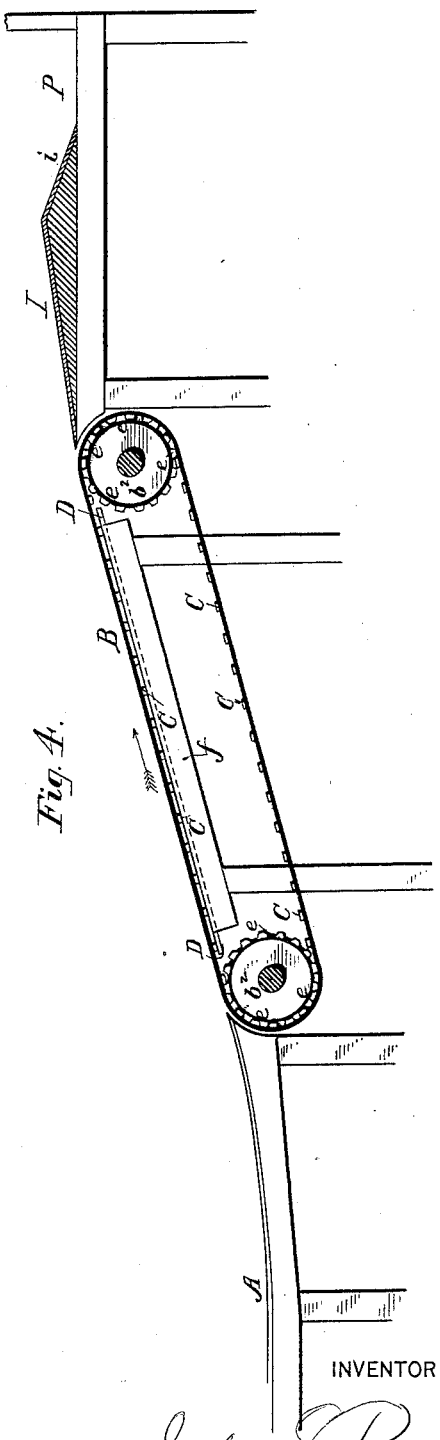
WITNESSES:
John Nolan
N H Culver
INVENTOR
Joshua Pusey (No Model.) 4 Sheets—Sheet 4.
J. PUSEY.
ARTIFICIAL COASTING OR SLEDDING COURSE.
No. 318,025. Patented May 19, 1885.
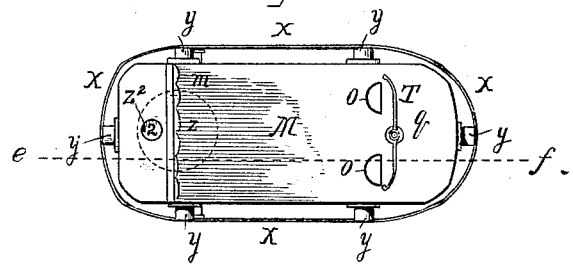
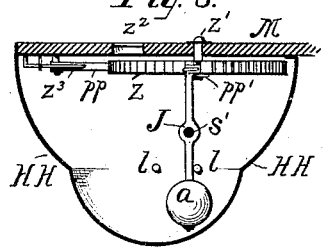
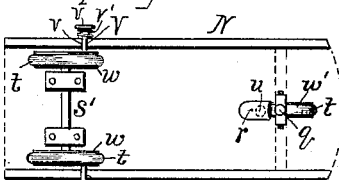
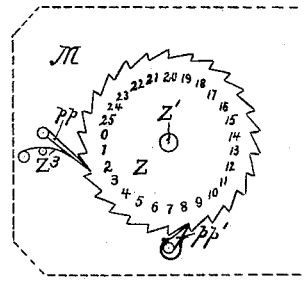
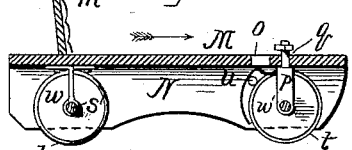
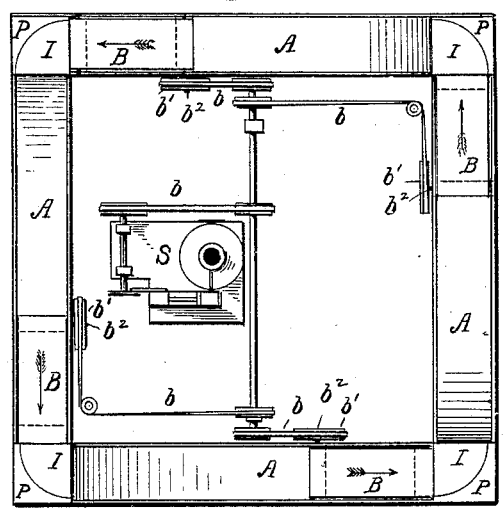
WITNESSES:
John Nolan
N H Culver
INVENTOR
Joshua Pusey

UNITED STATES PATENT OFFICE.

JOSHUA PUSEY, OF PHILADELPHIA, PENNSYLVANIA.

ARTIFICIAL COASTING OR SLEDDING COURSE.

SPECIFICATION forming part of Letters Patent No. 318,025, dated May 19, 1885.

Application filed January 21, 1884. (No model.)

*To all whom it may concern:*

Be it known that I, JOSHUA PUSEY, a citizen of the United States, residing at the city and county of Philadelphia and State of Pennsylvania, have invented certain new and useful Improvements in Artificial Coasting or Sledding Courses, of which the following is a full, clear, and exact description, reference being had to the accompanying drawings, of which—

Figure 1:
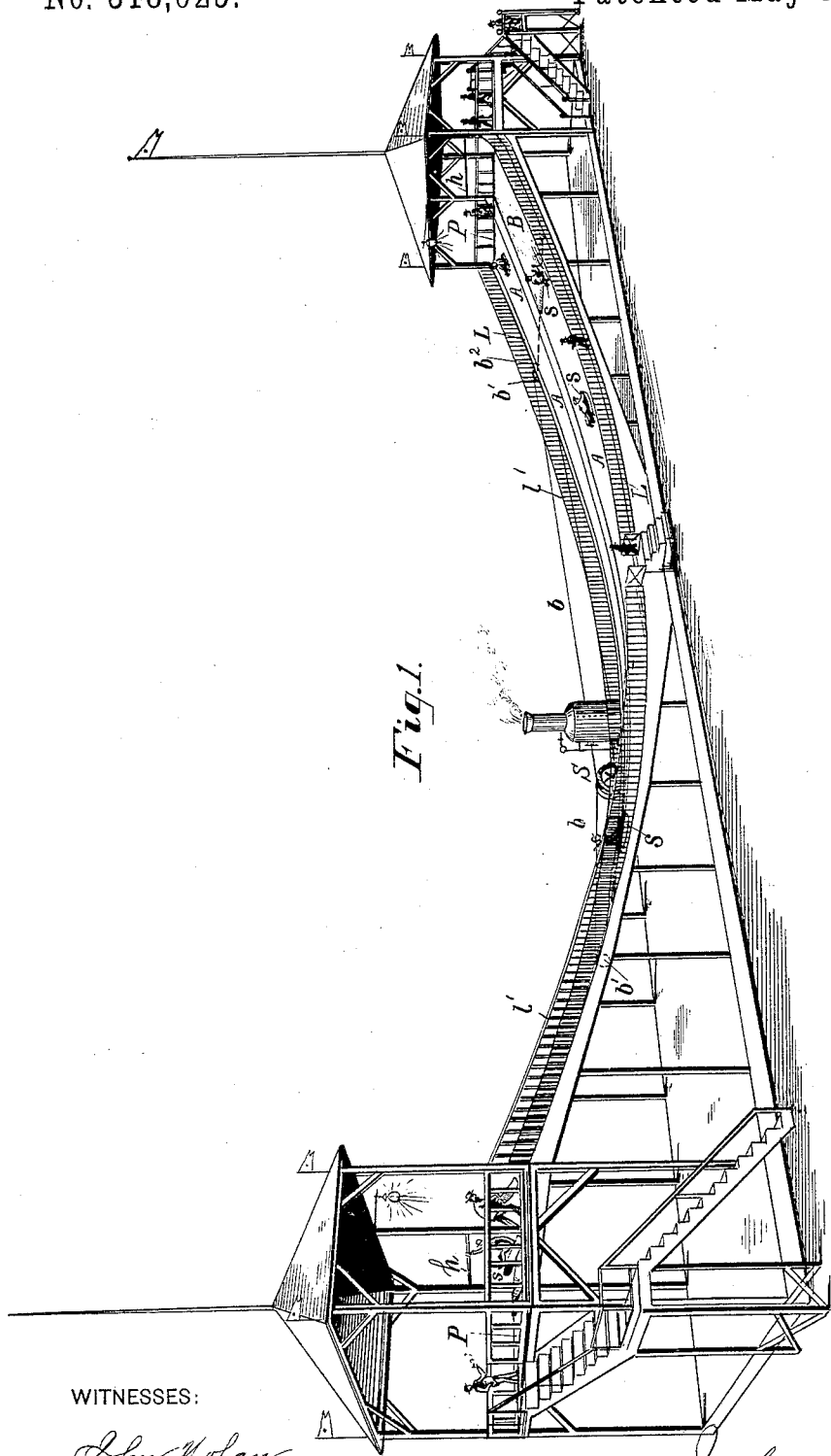
Figure 2:
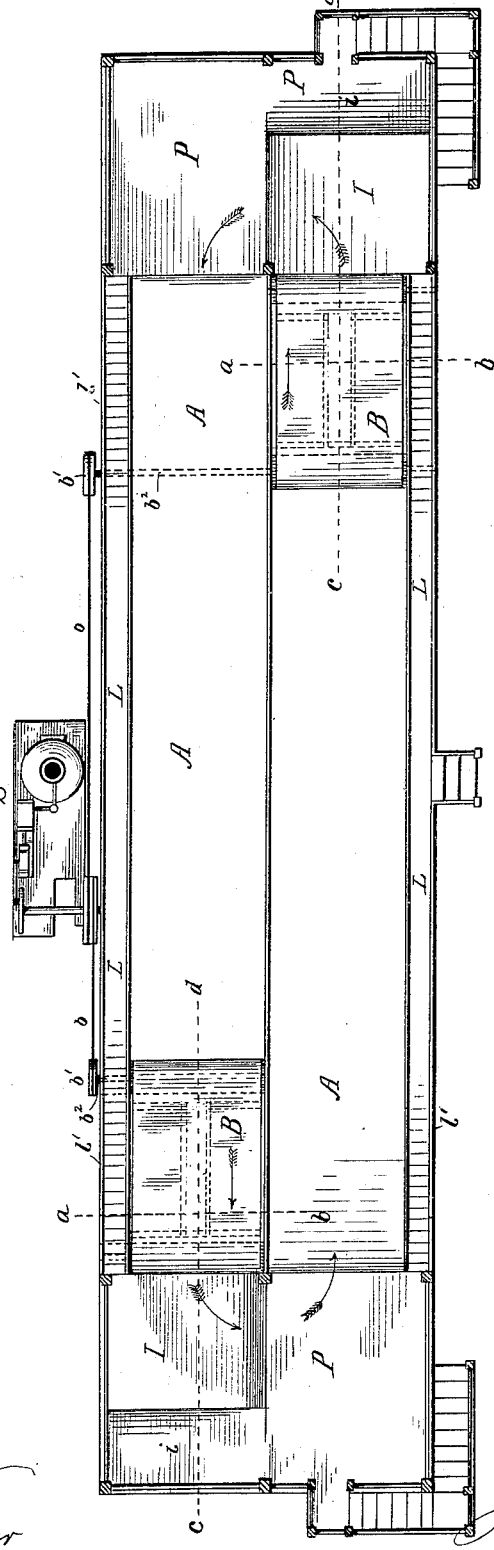

Figure 1, Sheet 1, is a general perspective view; Fig. 2, Sheet 2, a plan; Fig. 3, Sheet 3, an enlarged longitudinal section through the elevator, &c., as on line $a\,b$, Fig. 2; Fig. 4, a transverse section enlarged of said elevator, &c., as on line $c\,d$, Fig. 2; Fig. 5, Sheet 4, a plan of the sled or coasting-vehicle; Fig. 6, a similar view of the sled, the top or seat having been removed; Fig. 7, a longitudinal section as on line $e\,f$, Fig. 5, the buffing and trip-registering devices having been removed; Fig. 8, a side elevation, partly in section, of the trip register or counter; Fig. 9, a plan of the same; and Fig. 10 shows the coasting-course arranged to form a rectangle.

The same reference-marks, where they occur in the several figures, indicate the same or corresponding parts.

The general nature of this my invention is an artificial coasting or sledding course or track arranged in series, each of the series being composed of two oppositely-inclined contiguous facing hills, the adjacent summits of the several series communicating, whereby the coasters may glide down the one, which may be termed the "first" hill of a series, and nearly to the top of the other or second hill without stopping, then ascend to the adjacent hill of the next series, and so on continuously.

The invention relates also to the combination, with such coasting-course, of means at and near the tops of alternate hills of the several series for aiding the coasters to ascend the remainder of the hill up which they have run a certain distance by the momentum acquired in descending the first or opposite hill.

The invention relates further to the combination, with said coasting-course, of a device—to wit, an inclined endless belt or elevator adapted to be driven by suitable motive power for the purpose of conveying the coasters on up to the summits of the alternating hills of the several series, said elevator being located in such position that the sleds with their occupants—may run directly up on the same, thereby obviating the necessity of the coasters getting off the sleds.

The invention further relates to the details of construction of the said elevator device, which will be hereinafter described and pointed out in certain of the claims.

The invention finally concerns also the construction of the sled or vehicle adapted to be used in connection with my said coasting-course, which will also be fully explained and duly claimed.

Referring now to the annexed drawings, A marks the series of coasting tracks or ways, each being, say, fifteen feet, more or less, in width. These constitute in effect two coinciding hills facing one another, and more or less inclined or curving upward from their base or junction. I prefer that each series of these double hills, taken together, should form substantially a catenary curve, as seen in Fig. 1, the highest points whereof being a suitable distance apart, say, for example, five hundred feet, and elevated a suitable height, say, twenty-five or thirty feet, more or less, above the base. All of these dimensions or any of them may, of course, be considerably varied without affecting the operation of the principle of the invention. The flooring A forming the coasting-track may be supported upon posts, as shown, or by cables suspended from pillars similar to wire suspension-bridges; and, if desired, the surface of the flooring may be rendered quite smooth and even by a preservative light coating of asphalt. When the course comprises but two series of double hills, as in Figs. 1 and 2, they are placed side by side as shown, the adjacent summits communicating by means of a common platform, P. When it consists of more than two series, these are arranged in the form of a rectangle, as in Fig. 10, or of a triangle or a polygon, according to the number of the series. The sleds run down the first hill of each series, and are carried by their momentum a considerable distance on up the side of the second hill, the remainder of the latter being surmounted to the platform P in a convenient manner. In order, however, to provide a means for conveying the coasters and sleds on up from such point beyond which the momentum will not carry them, I provide a wide endless belt or elevator, B, whose upper side is practically a continuation of the track or floorway of the second hill of the respective series. This belt runs over pulleys or drums journaled in suitable frame-work, and is driven forward—that is, in the direction in which the sleds run—by means of a steam-engine, S, or other motor, through belts $b$, running over pulleys $b'$, on the shafts $b^2$ of the elevator-drums.

As a matter of convenience and economy, I prefer to locate the engine about equidistant from the driven pulleys, as in Figs. 1, 2, and 10, although where the length of the course is excessive it will perhaps be preferable to have an engine for each elevator.

The special construction of the said elevating device that I prefer consists of an endless belt, B, of stout canvas or other suitable material, to which are secured at intervals a series of transverse bars, C, Figs. 3 and 4, whose ends extend beyond the edges of the belt into lateral guideways D, and engage with indentations $e$ of the sprocket-wheels W at the ends of the supporting-drums E. When the belt is in motion, the side extensions of bars C slide in the said guideways, whereby its upper side is sustained. The belt need not be so wide as the track; but when the former is of considerable width it may be kept from sagging transversely by means of one or more longitudinal beams, $f$, upon which the middle part of the cross-bars C ride. At the upper end of this elevator is the platform P, that communicates with the first hill of the next series. This platform may be of any desired dimensions and roofed over, as shown in Fig. 1, for spectators as well as the coasters. I also provide an inclination, I, dipping toward that part of the platform in front of the first hill of the next series, whereby the sleds that have been carried up by the elevator may by proper steering run or circle down to said hill, as indicated by the curved arrows, Fig. 2, and thus the coasters are enabled to make a continuous circuit of the course. Said inclination may also dip over toward the level part of the platform, as at $i$, Fig. 2, so that the sleds may run onto and halt upon the latter instead of passing on at once down the hill.

In order to assist the sleds to mount up onto the platform or the inclination I, I place a cross-bar, $h$, Fig. 1, at a suitable height just above the junction of the belt B and the platform, which bar serves as a hold for the occupants of the sleds to give themselves a sufficient lift to surmount the inclination or platform. When, however, said belt is run at considerable speed, both the inclination I and cross-bar $h$ may be omitted, and the entire platform be made level, in which case the rapidly-moving belt will impart to the sleds $s$ momentum enough to carry them up onto the platform and with proper guiding around to the edge or beginning of the next hill.

As it will sometimes happen, accidentally or otherwise, that a coaster will not run far enough up the second hill to reach the elevator, and as it may be well for him to get out of the way of a multitude of fellow coasters in his rear and then ascend afoot to the top of one or the other of the hills, I provide lateral passage-ways L (with or without hand-rails $l'$ on the outside) separated from or elevated slightly above the general track or sledway, and leading to the summits of the hills, as seen in Figs. 1, 2, and 4. Thus a coaster whose course has been checked may step over from the main track to these passage-ways and draw his sled up the latter to the top of either hill, or up to the elevator and getting upon the same be conveyed on up to the top of the hill. The sledways A may, if preferred, be flooded or sprinkled with water from a hose, which, naturally in freezing weather (and if desired, by the application of well-known means, artificially in warmer weather) congealing, forms a coating of ice, thus adapting the track for use with ordinary sleds, or sleds with low heavy runners of ice might be used instead. I have, however, designed a sled or vehicle on wheels that is specially devised and adapted for use, in connection with my hereinbefore-described coasting-course at all seasons of the year. This sled is constructed as follows, reference being had to Figs. 5 to 9, inclusive, on Sheet 4 of the accompanying drawings.

M is the top or seat of the vehicle, which may also be provided with a back, $m$, and N are the sides or runners when the wheels are detached. At the rear end are two wheels, $w$, projecting a short distance below the runners or sides, and journaled independently upon a fixed shaft, $s'$. The forward end of the sled rests upon a similar wheel, $w'$, journaled in a frame, $p$, of a rotatable standard, $q$. This standard projects a short distance above the top M, and to it is secured a transverse bar, T, whose ends or arms are preferably curved back, as seen in Fig. 5. The feet of the coaster resting against the arms of said bar, he is thus enabled to readily guide the vehicle by pressing on the right or the left, thereby turning wheel $w'$.

In order to provide a rest or support for the feet, I make openings O in the top of the sled just in front of the foot-bar T, as seen in Figs. 5 and 7. By placing his heels or about the middle of his feet against the front side of these spaces the coaster can, by moving either foot back or forth, turn the bar T within certain limits. When, however, it is required to turn a quick curve, as when circling around in passing from the second hill of one series to the first of the next, the feet may be lifted out from said openings in order to give to the bar, and consequently the wheel $w'$, the requisite turn.

As an automatic means to prevent the sleds from running backward after they come to a stop on the second hill—that is, more especially upon the elevator B—I secure to the standard $q$, that carries wheel $w'$, a box, $r$, whose inside tapers back and down toward and near to the periphery of the wheel, and a light friction-ball, $u$, of india-rubber or other suitable substance, is inclosed between said box and wheel, as illustrated in Fig. 7. By this construction it is obvious that while the wheel is running forward the ball $u$ rides freely; but the instant the sled starts to go back the ball falls, or is carried down and wedges between the box and the rim of the wheel.

Other means well known to skilled mechanics for effecting a like purpose may be substituted for the device just described—a ratchet and pawl, for example. The rims of the wheels $w$ $w'$ are grooved in order to receive and retain rubber rings or tires $t$, whereby the running of the vehicles is rendered smooth and noiseless. The rubber tire of wheel $w'$, also, by its bite or friction upon the elevators B keeps the sleds from sliding back upon the latter, which they would be apt to do if the said wheel, when checked as described, then became practically a smooth runner. The sleds may also be provided with brakes, V, Fig. 6. These consist in the present instance of lateral studs $v$ passing freely through openings in the sides N of the sleds, their inner extremities being directed toward the sides of the wheels $w$, respectively. Said brakes are ordinarily kept out of contact with the latter by means of spiral springs $v'$, but may be forced hard against the sides of the wheels by the coaster pressing laterally upon the projecting knobs $v^2$, as circumstances may require. I may here observe that by removing the wheels $w$ $w'$ the vehicle is changed into an ordinary sled, as it will then rest upon the sides or "runners" N.

In order to obviate serious accidents, which might otherwise result from the sleds running into an obstacle, I provide a buffing device. (Shown only in Fig. 5.) It consists of a stout cord, or it may be an elastic metallic band, X, extending out and around the sides and ends of the sled and held in position by means of studs $y$ of elastic material, preferably india-rubber, which studs are secured to the top board M of the sled. If the sleds are armed with this device and they strike any obstacle or are run into by another sled, either at the front, sides, or rear, these buffers come into play and a serious accident is not apt to follow the collision. I also combine with the sleds an automatic counting device for conveniently registering the number of trips made by each sled on the coasting-hills. Such a device is useful where the sleds are hired to the coasters at so much a trip or number of trips. This device consists of a ratchet register-wheel, Z, Figs. 5, 8, and 9, journaled on a stud, $z'$, fastened to the under side of the top M of the sled, which has a glass-covered opening, $z^2$, therein, through which the figures 1 2 3, &c., upon the upper side of the wheel, arranged in a circle, are successively made visible as the wheel is rotated. A pawl, $p$ $p$, controlled by a spring, $z^3$, engages with the teeth on the periphery of the wheel in order to prevent the latter from being turned back. The motive power for actuating this wheel is furnished by gravity each time the sled ascends one of the hills, through the medium of the following mechanism: A two-armed vertical pendant, J, having a weight, $a$, upon its lower arm and at the end of its upper arm a spring-controlled pawl, $p$ $p'$, that engages with the teeth of the counter-wheel, swings freely upon the shaft $s'$ or other support fixed to the sled. The extent of the vibration of pendant J may be limited by side stops, $l$, which may also be made adjustable. When the sled is upon the level or is running downhill, the pendant takes the position shown in Fig. 8; but when it goes uphill it in effect swings back—that is to say, its upper arm, which bears the pawl $p$ $p'$, rotates forward, and thereby turns the dial-wheel Z one tooth and registers the trip by bringing the succeeding number in front of the opening $z^2$. When the sled reaches the top of the hill, the pendant, seeking the vertical position, causes pawl $p$ $p'$ to drop into the next tooth of the wheel, and so on continuously. A suitable housing, H H, inclosing the mechanism, serves to protect the latter and to prevent it from being tampered with.

It will be obvious that a slight modification in the arrangement of the parts of the device will enable it to register at the descent instead of the ascent of a hill.

Having thus described the construction of my invention, its operation and mode of using the same require but a brief description. The coasters in the first place ascend to either of the platforms P by way of the flights of steps (seen in Figs. 1 and 2) leading thereto, and seating themselves upon the sleds, their feet resting against the front edge of openings O and against the steering-bar T, start down the first hill of either of the series of which the course or "rink" is composed. The sleds glide swiftly and noiselessly down the one hill and then run up the opposite hill until they come to a stop on the elevator B, their backward movement being instantly checked by the automatic device hereinbefore described. They are conveyed up to the platform, whence, if desired, they may continue on around to the first hill of the next series, as before explained. The space underneath the elevated parts of the structure may be inclosed or otherwise, and utilized for some other amusement, or as a storehouse for the sleds, or any other suitable purpose. When the series of hills are arranged to form a triangle, square, &c., the inclosed space may be floored over and used as a parlor-skating rink, promenade, &c. The structure may be made in sections, readily taken apart and put together for convenience of transportation to county fairs, &c.

My invention furnishes the means for enjoying a very attractive and exhilarating sport, wherein those things which deter many persons, especially ladies and elderly persons, from ordinary coasting are not present, for here it is about all fun and no work. The many coasters racing from hill to hill—young and old, male and female—the flags flying from the staffs above the platforms, the numerous spectators, and the bands of music, perhaps, upon the platforms, all together will form an animated and an entertaining scene, whether the time be at day in the bright sunlight, or at night when the moon sheds its radiance or the electric light casts its dazzling brilliancy over the scene.

I am aware of the fact that an endless driven chain or belt has been described in combination with an artificial sledding-hill to carry the sleds back up to the summit of the hill, the said chain or belt being provided with hooks which engage with loops on the sleds—as, for instance, shown in the patent of T. Alexander, No. 269,554, dated December 26, 1882. I do not therefore claim, broadly, the use or combination, with a sledding-hill, of an endless belt for returning sleds to the top of the hill. This feature of my invention (as intended to be claimed in the fourth claim of this specification) relates only to an endless belt or carrier, upon which the sleds are adapted to run and be held to the belt by friction; but I do not wish it to be understood that I am limited to an elevating device constructed or arranged as herein shown, as will appear by certain of the claims hereinafter made.

I am also aware of the fact that a coasting-hill has been used consisting of a circular railway descending on each side from an elevated platform, upon which railway the cars descend by gravity from the highest to the lowest point and are carried around by their momentum nearly up to the starting-point.

Having thus described my invention, I claim as new and wish to patent—

1. An artificial coasting course or rink, consisting of a series of longitudinal ways, each of the series being made up of two continuous inclined ways ascending in opposite directions from their junction and connected at the adjacent summits by common platforms, in combination with the mechanism for carrying the sleds or carriages over the summits, the summits being of substantially the same height, substantially as specified.

2. In combination with an artificial coasting-course, consisting of a series of trackways, each of the series being composed of two continuous ways ascending in opposite directions from their junction, means, substantially as described, for conveying the coasters or sleds on up beyond the point to which they are carried by the momentum acquired in descending the opposite incline to the summits of the trackways, substantially as set forth.

3. In combination with a coasting-course, consisting of a series of trackways, each of the series consisting of two continuous ways ascending in opposite directions from their junction, endless moving belts or carriers located at alternate ends of the several series, whereby the sleds are adapted to run upon said belts by the momentum acquired in descending the one incline, and by which belts the sleds are conveyed on up to the top of the opposite incline of the series, substantially as and for the purpose stated.

4. In combination with an artificial coasting course or hill, an inclined moving belt or carrier arranged with relation to said hill, so that the sleds are adapted to run upon said belt after having descended the hill and be retained thereon by friction and carried up thereby, substantially as and for the purpose described.

5. In an artificial coasting-course composed of a series of continuous double hills, inclined endless belts or carriers at and near the alternate ends of each of the several series, the upper sides of said belts being practically a continuation of the hill, together with suitable motive power for imparting motion to said belts, substantially as and for the purpose recited.

6. The combination, with the coasting-course, of the endless belts, the sprocket-wheels, the cross-bars secured to said belts, and the guideways in which said bars slide, all constructed and operating in the manner and for the purpose substantially as described.

7. The combination of the coasting-hills, the elevators, and the inclines I, substantially as and for the purpose described.

8. The combination, with the coasting-hills provided with the endless belts or carriers, of the lateral footways L, separated from or elevated above the main tracks and communicating with the summits of the hills, substantially as and for the purpose set forth.

9. In combination with a coasting-course provided with the endless belts or carriers, as described, a sled or coasting-vehicle provided with automatic devices, substantially as shown, for preventing the sled from running backward under the circumstances mentioned, as and for the purpose set forth.

10. The combination, with the sled or coasting-vehicle, of the tapering box $r$, ball $u$, and wheel $w'$, substantially as and for the purpose recited.

11. In combination with the sled provided with the turn-wheel and steering-bar, the openings O in front of said bar, substantially as and for the purpose specified.

12. In combination with the sled, the lateral spring-controlled brakes, constructed and operating substantially as and for the purpose specified.

13. In combination with the artificial coasting-course, the wheeled coasting-vehicle having rubber-tired wheels, and means, substantially as described, for preventing said wheels from running backward, substantially as and for the purposes set forth.

14. The combination, with a sled or coasting vehicle, of a gravity-operated trip-registering device attached thereto, constructed and adapted to operate substantially as described.

15. The combination, with the sled, of the ratchet or dial wheel, the swinging pendant having a pawl, as $p\ p'$, adapted to engage with the teeth of said wheel and to actuate the same at intervals, as stated, all constructed and operating substantially as and for the purpose set forth.

16. The combination, with the sled, of the ratchet counter-wheel, pawl $p\ p$, swinging pendant J, pawl $p\ p'$, and lateral stops $l$, substantially as and for the purpose specified.

In testimony whereof I have hereunto affixed my signature this 19th day of January, A. D. 1884.

JOSHUA PUSEY.

Witnesses:
JOHN NOLAN,
FRANCIS S. BROWN.